United States Patent

Obermeier et al.

[11] Patent Number: 5,974,545
[45] Date of Patent: Oct. 26, 1999

[54] CIRCUIT BREAKER TRIP UNIT PROCESSOR INITIALIZATION PROGRAM

[75] Inventors: Mark J. Obermeier, Coventry; Paul H. Singer, West Harford; Alan J. Messerli, Bristol, all of Conn.

[73] Assignee: General Electric Company, Schenectady, N.Y.

[21] Appl. No.: 08/934,868

[22] Filed: Sep. 22, 1997

[51] Int. Cl.[6] .................................................. G06F 9/00
[52] U.S. Cl. ....................................... 713/1; 713/2
[58] Field of Search ............................. 713/1, 2, 100; 395/651, 652, 653

[56] References Cited

U.S. PATENT DOCUMENTS

| 4,428,022 | 1/1984 | Engel et al. | 361/96 |
| 4,489,394 | 12/1984 | Borg | 395/651 |
| 4,672,501 | 6/1987 | Bilac et al. | 361/96 |
| 4,710,845 | 12/1987 | Demeyer | 361/96 |
| 5,159,519 | 10/1992 | Cassidy et al. | 361/96 |

*Primary Examiner*—Dennis M. Butler
*Attorney, Agent, or Firm*—Cantor Colburn LLP; Carl B. Horton

[57] ABSTRACT

The idea behind this algorithm is to provide prioritized data in an optimal sequence to expedite initialization/activation of ordered processes necessary to effect circuit protection functionality from a circuit breaker trip unit.

6 Claims, 3 Drawing Sheets

CIRCUIT BREAKER TRIP UNIT PROCESSOR INITIALIZATION PROGRAM

BACKGROUND OF THE INVENTION

The use of microprocessors within circuit breaker trip units such as described within U.S. Pat. No. 4,672,501 entitled "Circuit Breaker and Protective Relay Unit", requires that the microprocessor becomes fully powered-up before the trip unit is capable of performing overcurrent protection.

U.S. Pat. No. 4,428,022 entitled "Circuit Interrupter with Digital Trip Unit and Automatic Reset" inactivates the microprocessor control lines until the circuit breaker power supply has completely enabled the microprocessor within the circuit interrupter trip unit.

To facilitate rapid operation of the circuit breaker trip unit immediately following a circuit interruption, U.S. Pat. No. 4,710,845 entitled "Digital Static Trip Device for Circuit Breaker", describes storing of the last circuit current samples received prior to interruption. The patent further describes the use of an analog trip unit to provide protection during start up and initialization of the trip unit microprocessor.

U.S. Pat. No. 4,489,394 entitled "Microprocessor Power on Reset System" describes a method whereby the microprocessor initialization signal is deferred after power loss until the microprocessor has become completely enabled.

In most circuit interruption devices containing a microprocessor within the trip unit, additional circuit components are used to insure that the microprocessor becomes fully powered up before initialized to commence circuit protection function to avoid both failure to interrupt upon actual overload as well as to prevent interruption under quiescent circuit conditions, as so-called "nuisance" tripping. In certain applications, protection functions and/or application-related configuration data must be read into the microprocessor during the initialization process for the microprocessor to become fully functional. Also required to effect the circuit protection function is the application of the sampling algorithms used by the microprocessor to make the overcurrent determinations.

One example of a sampling algorithm used within a trip unit microprocessor for overcurrent calculation is found within U.S. Pat. No. 5,159,519 entitled "Digital Circuit Interrupter with Improved Sampling Algorithm".

It would be advantageous to provide for both power-up as well as initialization of a circuit breaker trip unit without compromising the ability of the circuit breaker to interrupt upon actual overcurrent or short circuit and without requiring additional circuit components.

One purpose of the invention is to allow rapid power up initialization of the circuit breaker trip unit microprocessor by virtue of the programs resident in the microprocessor without the requirement of additional circuit components.

SUMMARY OF THE INVENTION

Ancillary initialization algorithms are applied in a circuit breaker trip unit microprocessor during start up of the microprocessor to expedite initiation of the sampling process and application of protection algorithms. The ancillary initialization algorithms expedite the application of protection during the time period in which the microprocessor is first powering up and initialized. When the initialization process is completed, the ancillary initializations are replaced by the selected operational values.

DESCRIPTION OF THE PREFERRED EMBODIMENT

Figure 1:
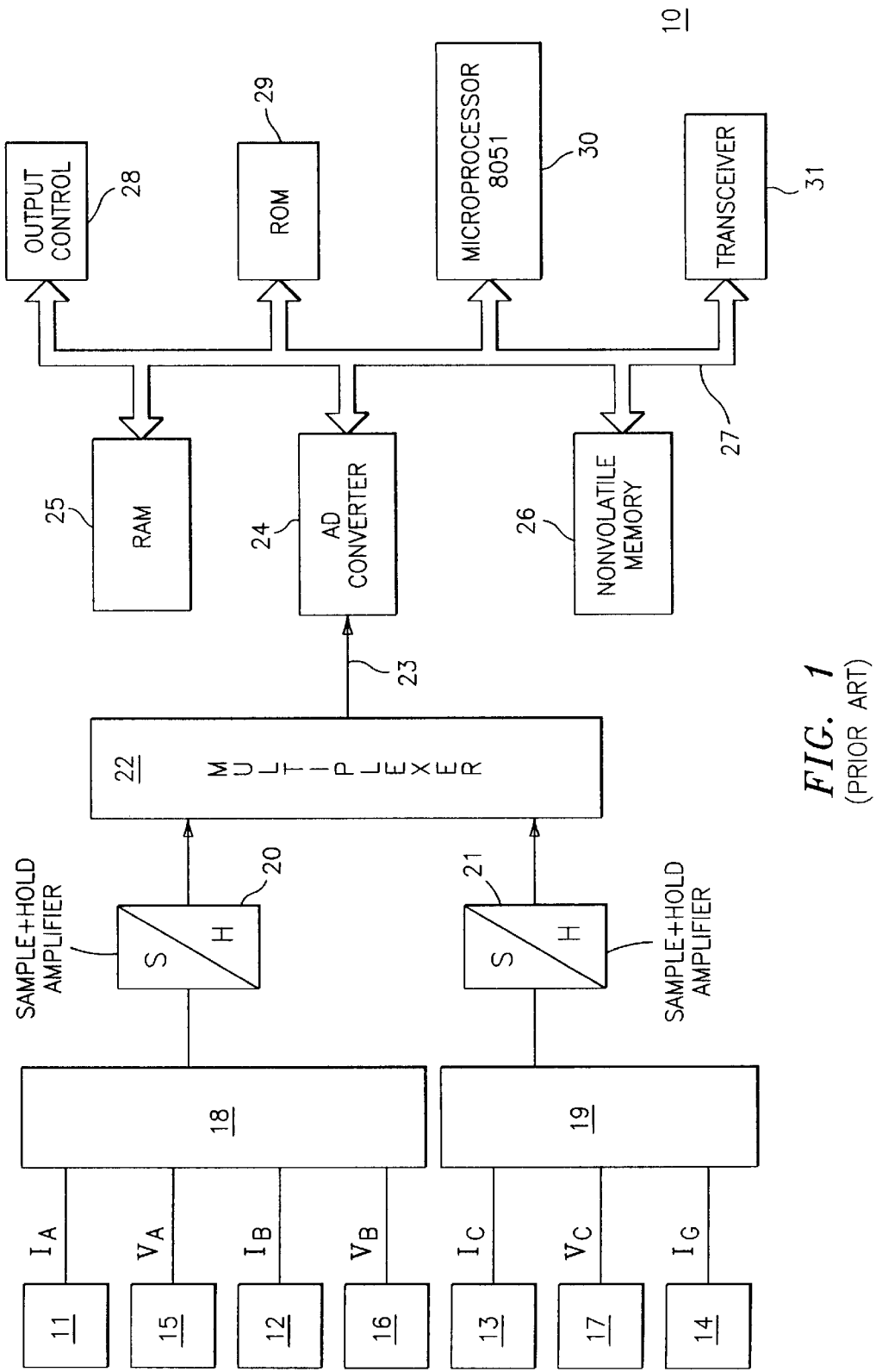
FIG. 1 is a diagrammatic representation of the use of a microprocessor within a circuit breaker trip unit according to the Prior Art.

Before describing the circuit breaker digital trip unit of the instant invention, it is helpful to review one such digital trip unit 10 according to the Prior Art as depicted in FIG. 1 and which operates in accordance with the teachings contained within the aforementioned U.S. Pat. No. 4,672,501. Current and voltage signals obtained from current and voltage transformers 11–17 connected within an electrical distribution system are transmitted through first multiplexers 18, 19 through sample and hold amplifiers 20, 21 to a second multiplexer 22. The signals are then transmitted through a conductor 23 and A/D converter 24 onto an internal data bus 27 communicating with a microprocessor 30, RAM 25, NVM 26 and ROM 29 for outputting control signals via the output control 28 and data signals via the transceiver 31. As described within the aforementioned U.S. Pat. No. 4,672,501, sampling algorithms are used to input representative data signals to the microprocessor 30 in prescribed timing intervals and a number of optional functions are stored within the NVM 26 such as undervoltage determination, trip occurrence indication, configuration setpoints, calibration factors and the like. When power is first applied to the trip unit, via the current transformers 11,12,13, some time is required for the microprocessor to power up and to become initialized, that is, enabled to operate on programs stored within the ROM 29. The microprocessor calibration constants are generally stored within the NVM 26 and are transferred to the RAM 25 for operation by the microprocessor 30 immediately upon start up. The microprocessor 30 generally remains non-functioning for a measurable time period until all data become resident within the RAM 25.

Figure 2:
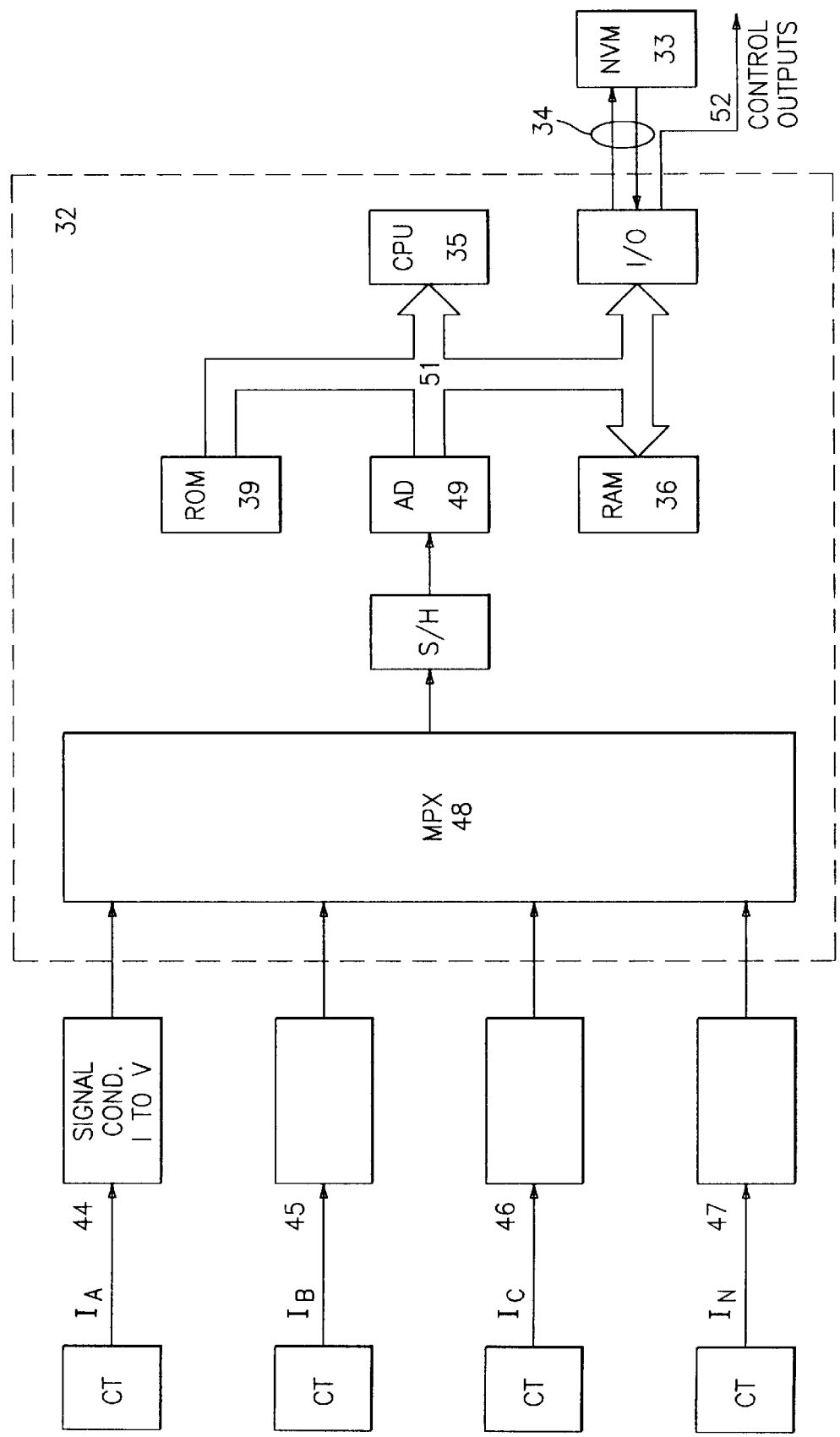
FIG. 2 is a diagrammatic representation of the microcontroller used within the circuit breaker trip unit according to the invention.

A state of the art microcontroller 32 is shown in FIG. 2 and internally contains most of the discrete components shown within trip unit 10 of FIG. 1. The external NVM 33 connects with the microcontroller 32 by means of conductor 34 and contains the trip unit configuration code as well as the calibration factors used with the current sampling algorithms described earlier. Since the microcontroller can have several configurations depending upon customer requirements, the data stored within the NVM can be substantial. Upon start-up the data transfers from the NVM 33 to the RAM 36 as well as from the ROM 39 to enable the CPU 35 to become operational. The current signals from the associated electrical distribution system are inputted rough conductors 44–47 to the multiplexer 48 to the A/D converter 49 and therefrom the CPU 35 over data bus 51 for providing the requisite protection function over the output conductor 52 in the manner described within the aforementioned U.S. Pat. No. 4,672,501. It has been determined that there is a delay from the time that the contacts within the associated circuit breaker (not shown) first close to the time that the microcontroller 32 becomes operational in view of the large amount of data that is transferred to the RAM 36 from the NVM 33.

Figure 3:
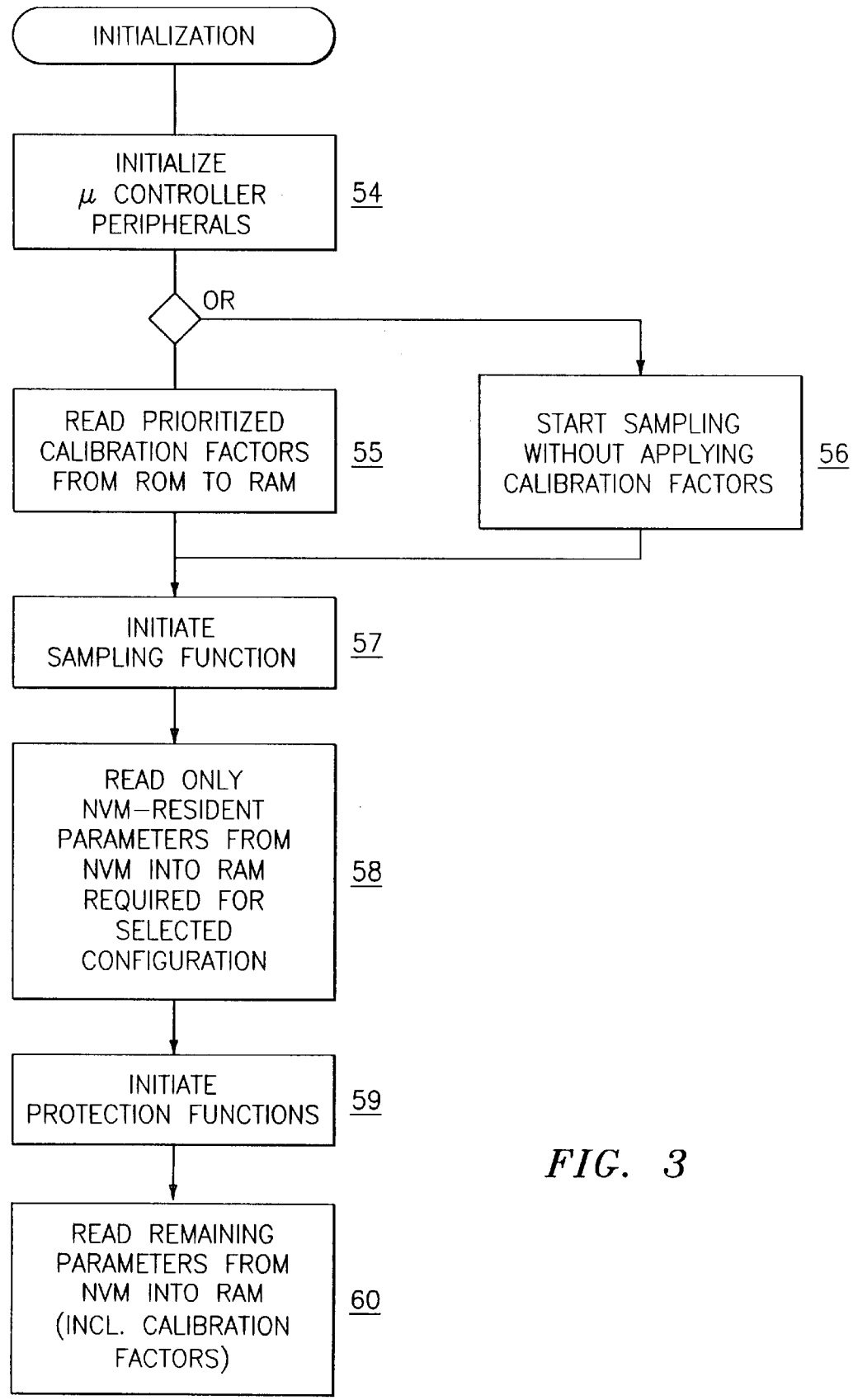
FIG. 3 is a flow chart diagram of the procedure used for the ancillary initialization and complete initialization algorithms stored within the microcontroller of FIG. 2.

In accordance with the invention, referring also now to FIG. 3, the prioritization algorithm flow chart (53) provides the RAM 36 with the essential data required for immediate circuit protection, before providing the other data stored therein, to allow the current values to be operated upon within the CPU 35 in a timely manner. Upon initialization, the microcontroller peripherals such as the RAM 36 and CPU 35 first become initialized (54) and the sampling calibration factors are read from ROM to RAM (55). Alternatively, the CPU can immediately begin sampling the current without applying the calibration factors (56), if so desired. The sampling algorithms are then initiated (57) to operate on the current values (44–47 in FIG. 2) and only those values selected for the particular trip unit configuration within the NVM 33 are read to the RAM (58) to allow the CPU 35 to provide overcurrent protection function 59. Once the CPU 35 has begun the protection function 59, the remaining contents of the NVM 33 (including selected calibration factors) are read into the RAM (60) to complete the microcontroller initialization.

A circuit interrupter having a microcontroller trip unit with immediate circuit protection upon initialization has herein been described. A prioritization algorithm stored within the microcontroller first transfers the data essential for circuit protection before transfer of the remaining data stored therein.

We claim:

1. A trip unit for a circuit interruption device comprising:
   a microcontroller containing selective circuit protection functions, said microcontroller providing an interruption signal upon occurrence of an overcurrent condition within an associated protected circuit;
   a NVM connecting with said microcontroller, said NVM containing trip unit configuration instructions, trip unit setpoints and sampling calibration factors;
   a ROM within said microcontroller, said ROM containing operating programs enabling said microcontroller for sampling circuit current and providing overcurrent determination.
   a RAM within said microcontroller, said RAM interacting with said ROM and said NVM for inputting said trip unit configuration instructions, trip unit setpoints, sampling calibration factors and said operating programs enabling said microcontroller for sampling circuit current and providing overcurrent determination function to said microcontroller; and
   a prioritizing program within said ROM for providing said RAM with prioritized sampling calibration factors enabling said microcontroller for sampling circuit current, then providing said RAM with said trip unit configuration instructions and said trip unit setpoints enabling said microcontroller to provide overcurrent determination prior to providing said RAM with selected sampling calibration factors.

2. The trip unit of claim 1 wherein said prioritizing program provides said RAM with said sampling calibration factors prior to providing said RAM with said trip unit configuration instructions and said trip unit setpoints.

3. The trip unit of claim 1 wherein said trip unit configuration instructions comprise short time, long time and ground fault determination algorithms.

4. A circuit interrupter comprising:
   a pair of separable contacts arranged for connection within a protected electrical distribution system;
   a trip unit providing signals for opening and closing said contacts, said trip unit including: a microcontroller containing selective circuit protection functions, said microcontroller providing an interruption signal to open said contacts upon occurrence of an overcurrent condition within said protected electrical distribution system;
   a NVM connecting with said microcontroller, said NVM containing trip unit configuration instructions, trip unit setpoints and sampling calibration factors;
   a ROM within said microcontroller, said ROM containing operating programs enabling said microcontroller for sampling circuit current and providing overcurrent determination; and
   a prioritizing program within said ROM for providing a RAM with said sampling calibration factors enabling said microcontroller for sampling circuit current and providing overcurrent determination prior to providing said RAM with said trip unit configuration instructions, said trip unit setpoints and said sampling calibration factors whereby said trip unit becomes operational when said contacts become closed.

5. The circuit interrupter of claim 4 wherein said prioritizing program provides said RAM with said sampling calibration factors prior to providing said RAM with said trip unit configuration instructions and said trip unit setpoints.

6. The circuit interrupter of claim 4 wherein said trip unit configuration instructions comprise short time, long time and ground fault determination algorithms.

* * * * *